Sept. 22, 1959  C. T. KELLOGG  2,905,294
SHUTTLE--PIN CLUTCH DRIVE MECHANISM FOR LAWN MOWERS
Filed March 12, 1956
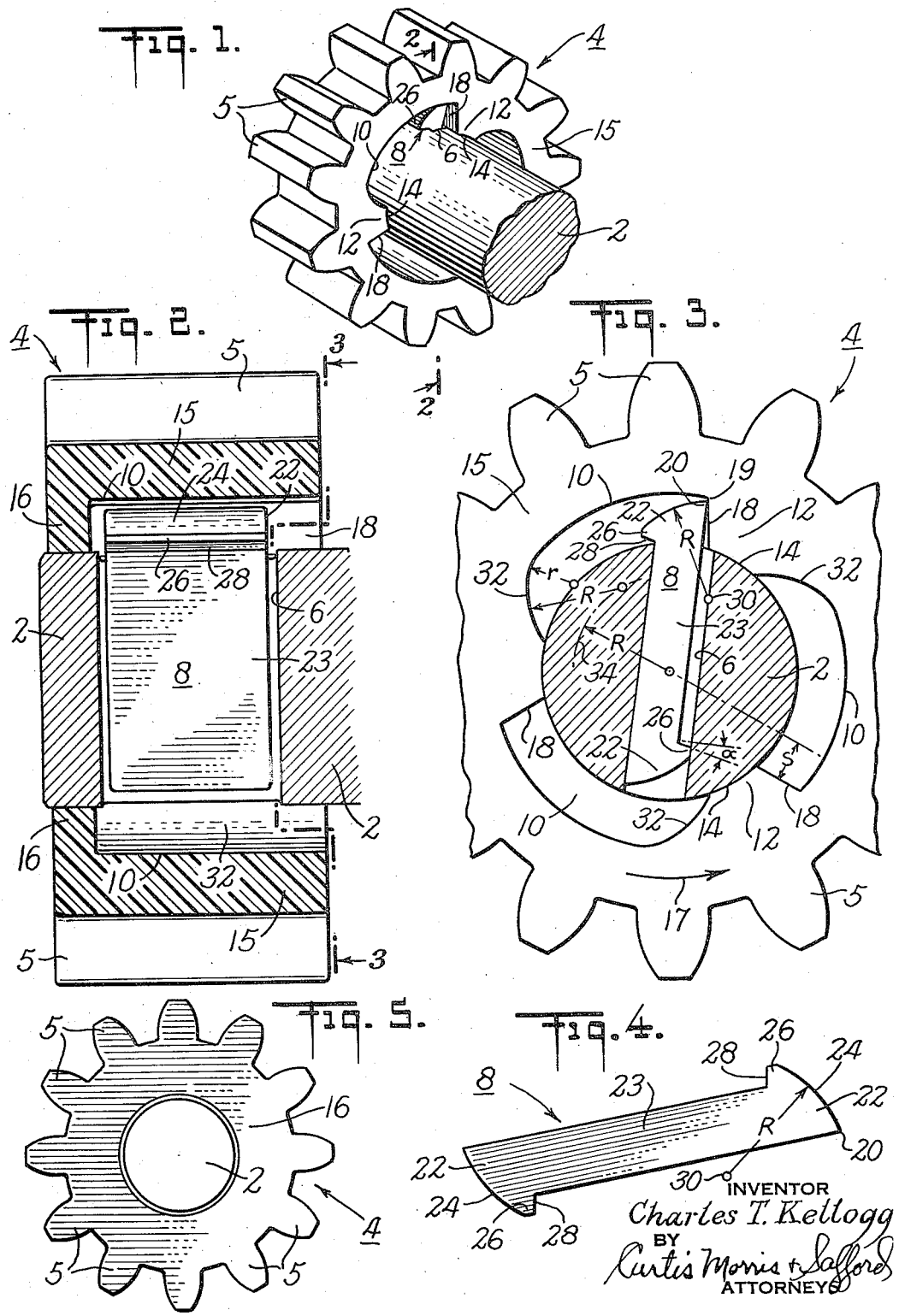
INVENTOR
Charles T. Kellogg
BY
Curtis Morris & Safford
ATTORNEYS

2,905,294

SHUTTLE-PIN CLUTCH DRIVE MECHANISM FOR LAWN MOWERS

Charles T. Kellogg, Middletown, N.Y., assignor to Clemson Bros., Inc., Middletown, N.Y.

Application March 12, 1956, Serial No. 571,064

1 Claim. (Cl. 192—46)

This invention relates to improved shuttle-pin clutch drive mechanisms of the type especially adapted for use in lawn mowers. These clutch mechanisms are highly suited to drive the cutting reel and allow the wheels to turn freely when the mower is pulled backward; also, they are highly suited for use in power mowers to apply driving torque to the wheels and enabling over-running of the wheels to occur as desired. More particularly this invention relates to an improved shuttle-pin clutch mechanism and to a moulded clutch gear of stiffly resilient, plastic material having high strength against shearing stresses and the characteristic of impact absorption and cushioning action under shock loading, and in a preferred embodiment described herein is nylon. This clutch gear includes an internal flange which engages the smooth surface of the shaft near one end of the slot. The flange in the bore of the gear provides additional bearing surface and acts as a web to reinforce the internally projecting clutch dogs. This invention is in the nature of an improvement over the clutch mechanism shown in U.S. Patent No. 2,330,667.

In the illustrative embodiment of my invention the clutch mechanism and moulded plastic clutch gear is described more particularly with reference to use for driving the clutch reel. Similar advantages result from use of this clutch mechanism in lawn mower power drive applications.

The shuttle-pin clutch mechanisms heretofore used to drive lawn mower reels have caused certain problems in manufacture and use. In these prior mechanisms, which have been used extensively, a high degree of toughness has been required in the body of the steel clutch gear and in the steel shuttle-pin in order to withstand the hammering and shock occurring during operation. Their surfaces have required special surface hardening heat treatments in order to assure the necessary wearing durability. This heat treatment makes these clutches now in use expensive to manufacture.

Moreover, the steel gear, shaft, and shuttle-pin are noisy in operation, and they require frequent lubrication. In most instances this lubrication has been overlooked, resulting in unusually marked wear and causing a very noisy rattling during use. Among the objects of my invention are to provide a quiet shuttle-pin clutch drive mechanism which requires only a minimum of lubrication during its operating life.

In the illustrative embodiment of my invention the clutch gear is molded from nylon and has a particularly advantageous shape which enables the gear to absorb and cushion the hammering and shocks of operation assuring a long and trouble-free operating life. Advantageously, the shuttle pin includes a locking lip which engages on the shaft during forward drive and assures positive engagement of the shuttle pin in fully extended position in square alignment with the full depth of the driving dogs inside the clutch gear. Thus, the nylon gear is always assured of operation with maximum leverage and mechanical advantage as it drives the shuttle pin and thus, reduced wear and tear are obtained along with quieter and smoother operation.

It is an advantage of the present invention that the need for the costly heat treating of the clutch parts can be eliminated, while at the same time the clutch is more rugged and reliable, lighter in weight, and less expensive to manufacture than the prior ones.

A further object of my invention is to provide a shuttle-pin clutch having a greater bearing area where the shaft is journaled in the clutch gear, thus assuring smooth stable rotation of the clutch gear and assuring more even wear of the parts.

In the shuttle-pin drive mechanisms used heretofore, considerable difficulty has been experienced after extensive use caused by the deformation of the engaging parts due to the severe and repeated hammering to which they are subjected in operation. The hammering of the clutch gear against the slidable shuttle-pin has deformed the pin and also widened and elongated the slot in which the pin is carried. This allows the motion of the pin to become somewhat sloppy and erratic and causes a disagreeable increase in the noise of operation. In certain instances the shuttle-pin jammed in one position preventing the clutch from disengaging and causing the mower blades to rotate backward when the mower is backed up.

The nylon clutch gear is stabilized in operation by the additional bearing surface resulting from the internal flange. It is an advantage of this gear that it runs smoothly and with little wear even in the complete absence of lubrication over extended periods of time. This gear cushions the motion of the shuttle-pin during engagement and during the rapid shuttle action which occurs during over-running of the clutch. Thus, advantageously, the hammering action is reduced and continued satisfactory operation of the shuttle-pin mechanism and substantial elimination of the deformation of the shuttle-pin and its slot is assured.

In the accompanying drawing and in the following description, I have shown and described a preferred embodiment of my invention and the advantageous interaction and engagement of the clutch elements. This description is not intended to be exhaustive nor limiting of the invention but on the contrary is given for the purpose of illustrating the invention and instructing others in the principles thereof and the best manner of adopting the invention to practical use, in order that others may be enabled to modify it and apply it in numerous forms, each as may be best suited to the conditions and requirements of any particular use.

In the drawing:

Figure 1 is a perspective view of the shuttle-pin clutch drive mechanism made in accordance with a preferred form of my invention;

Figure 2 is an axial sectional view taken generally along the line 2—2 of Figure 1 and shown on enlarged scale;

Figure 3 is a cross sectional view taken generally along the line 3—3 of Figure 2 and shown on the same scale as Figure 2;

Figure 4 is an enlarged view of the shuttle pin; and

Figure 5 is an end view of the outer face of the clutch gear made in accordance with my invention and shown on approximately the same scale as Figure 1.

Referring first to Figure 1 of the drawings, there is shown one end of a shaft 2. When used to carry the cutting reel, this shaft is supported in bearings (not shown) and extends across the width of the lawn mower with a suitable conventional type of cutting reel rigidly secured thereto, as will be understood. In certain instances this shaft 2 may be shorter and carry gears for driving the reel. When used in power mowers the shaft 2 is driven by the motor and the clutch gear turns the wheels, as will be understood.

On each end of this shaft 2 is a shuttle-pin clutch drive mechanism including a clutch gear or pinion 4 which is closely fitted around the end of the shaft and mounted to turn freely on the shaft. This pinion is advantageously moulded in one piece of a tough, stiffly resilient, moldable plastic material having high strength against shearing stresses and having the characteristic of impact absorption and cushioning action under shock loads, and in this preferred embodiment of my invention is nylon, which proves extremely advantageous under all conditions of operation. The clutch gear has teeth 5 around its periphery for engaging a suitable driving (or driven) gear (not shown); for example, in many mowers these teeth 5 engage an internal gear positioned on the wheel of the mower just inside of its rim. As now described the gear 4 is transmitting torque to the shaft, in certain power drive applications the shaft transmits torque to the gear, in which case the direction of rotation during engagement is reversed but the relative position of the clutch elements is the same.

Among the further advantages of the use of nylon in the clutch gear is that it eliminates spalling and reduces abrasion on the shaft 2. Moreover, in tests wherein the clutch mechanism is purposely filled with grit and sand I have found that the nylon in some manner not fully understood acts to protect the shuttle-pin and shaft from undue wear.

The shaft 2 has a slot 6 near the end in which is fitted a shuttle-pin 8. Each shuttle-pin is manufactured of suitable strong metal having a high shear strength, for example, as shown, it is steel and is smoothly finished, being just slightly smaller than the slot so as to slide easily back and forth therein.

Referring now to Figures 1, 2, and 3, the nylon clutch gear 4 is shown in operative position on the shaft 2 and in drive relationship with the shuttle-pin 8. The inside periphery of this clutch gear has three recesses 10 with cylindrical bottom surfaces. These recesses extend approximately ⅚ of the axial length of the gear from its inside end, that is, from the end facing away from the end of the shaft 2. As seen in cross section these recesses give a clover-leaf design to the inside periphery of the clutch gear. In between these recesses are three clutch dogs 12 having a generally trapezoidal shape with their tips 14 projecting inwardly from the annular body 15 of the gear toward its axis. Each of these dogs has a relatively wide internal cylindrical bearing surface 14 on its tip which engages the shaft and supports the clutch gear 4 for stable rotation on the shaft. At the outer end of the clutch gear (see also Figure 5) is an internally projecting flange 16 which forms a full circumferential bearing support engaging the unbroken perimeter of the shaft at the end beyond the slot 6. This bearing flange 16 together with the surfaces 14 assures a large total bearing area for the clutch gear. This increase in bearing area together with the reduction in weight advantageously provided by the nylon material assures stable smooth rotation of the clutch gear at all speeds and under all operating conditions. In the gear shown the internal flange 16 is 3/32 of an inch thick.

When the clutch gear is driving the shaft 2 it is rotated in the direction of the arrow 17. The trapezoidal shaped dogs 12 have driving faces 18 which extend flat and straight inwardly from their roots 19 and are advantageously inclined slightly ahead of a radial relationship. That is, the root portions 19 of these driving faces are positioned ahead of the tip portions in the direction of drive. This angle is 13° 15′ between the faces 18 and a radius through the root portion 19 of the surface 18. This relationship is obtained by having the driving face 18 parallel with a radius spaced a distance S ahead of the face. In the particular gear shown this distance S is 3/32 of an inch. Thus, when the clutch gear is driving the pin 8, the root portion 19 of one of these faces 18 engages the point 20 of the pin 8.

This particular relationship has many advantages. Because of its resilience, the annular body 15 of the nylon pinion absorbs and cushions any shock occurring as the point 20 of the pin strikes the driving face 18 of the dog 12. Because of their trapezoidal shape these dogs have a large circumferential extent where their roots join the annular gear body 15, thus providing a strong abutment to resist any shearing action by the point 20. Any slight deformation of the dogs which may occur during driving occurs at a point spaced away from the tips 14 of the dogs and thus does not adversely affect the cylindrical bearing surfaces 14 in which the shaft is journaled.

As shown most clearly in Figure 4, the shuttle-pin 8 includes a pair of head portions 22 on opposite ends of a shank 23. These heads have cylindrical outer cam surfaces 24 of radius R curving inwardly from the point 20 to a lip 26 which overhangs the adjacent flat side of the shank 23. This lip 26 has a locking surface 28 underneath it which is slanted out at a small but significant angle $\alpha$ with respect to a perpendicular relationship to the shank of the pin. This angle as shown is 15°. The edge of the lip has a small flat area parallel to the shank of the pin which helps to guide the pin when it shuttles back and forth in the slot 6.

When the clutch is in driving relation as shown in Figure 3, this locking surface 28 underneath the lip rises up onto the surface of the shaft 2 just in front of the slot. This positively locks the shuttle pin in its fully extended position. There is no opportunity for the pin to work back into the slot where it could apply the full driving load to the tip of the dog. With the pin locked into fully extended position, the root of the dog advantageously bears the load. Moreover, in this fully extended position the pin provides maximum leverage and so the clutch gear is working at maximum mechanical advantage and suffers least wear and least shearing action by the point 20. Thus, torque is smoothly transmitted throught the shuttle pin to the shaft 2 to turn the cutting reel, or alternatively, in power mowers, power is applied from the shaft through the pin to the gear. In either case, full extension of the pin provides maximum mechanical advantage, i.e., least shear stress on the nylon dogs 12.

The radius R is centered at a point 30 spaced from the shank about the same distance as the extent of overhang of the lip 26, that is, a distance of about .032 inch. The width of the slot is about four times this overhang dimension.

The trailing faces of the dogs 12 have cam surfaces 32. These surfaces are cylindrically curved in from their tips about half way on a first radius R centered on a circle 34 which is also of radius R, and which is equal to about ¾ of the radius of the shaft 2. The root portions of the cam surfaces 32 have a radius $r$ centered at the surface of the shaft 2 and equal to one-half of R. This radius $r$ is approximately tangent to the bottoms of the recesses 10.

When the pinion 4 is rotated opposite to the direction of the arrow 17 these cam surfaces 32 act upon the heads of the shuttle pin to cam the pin back and forth in the slot 6, thereby allowing free rotation of the clutch gear about the shaft, that is, the clutch is in idling condition. Among the further advantages of having the locking surface slanted outwardly is the ease with which the lip 26 rides up over the surface of the shaft 2 as the pin 8 is locked into driving relationship during the initial engagement of the clutch. Also, this slight inclination facilitates freeing the pin from its locked position when the clutch gear is reversed and the cam surface 34 strikes the head of the shuttle pin and cams it inwardly.

I find that this particular clutch mechanism operates smoothly, quietly and with substantially no wear over long periods of time and requires little lubrication. Even when it runs dry this clutch mechanism runs smoothly, quietly, and little wear is caused. In this particular gear 15 teeth are used having an overall diameter of 1.393 inches and a pitch diameter of 1.250 inches. The pressure angle of the teeth is 20° and the circular pitch is .2618. The axial length of the clutch gear is approximately 1 inch, and the shaft diameter is .581. R is 7/32 of an inch, and the effective internal diameter of the bottoms of the recess 10 is .820 inch. The shuttle pin has a length of .671 inch or about 15% greater than the diameter of the shaft. The shank thickness of the shuttle pin is .104 inch with a lip overhang of .034 inch.

From the foregoing it will be understood that the embodiment of the present invention described above is well suited to provide the advantages set forth, and since many possible embodiments may be made of the various features of this shuttle-pin clutch mechanism and as the apparatus herein described may be varied in various parts, all without departing from the scope of the invention, it is to be understod that all matter hereinbefore set forth or shown in the accompanying drawings is to be interpreted as illustrative and not in a limiting sense and that in certain instances, some of the features of the invention may be used without a corresponding use of other features, or without departing from the scope of the invention.

I claim:

In a lawn mower, an improved shuttle-pin clutch mechanism comprising: a metal shaft having a slot transversely through its end, a metal shuttle pin in said slot having an overall length greater than the diameter of said shaft, and a molded nylon-like plastic clutch gear having an annular body and fitting on said shaft around said shuttle pin, said clutch gear having an internal flange projecting in at one end and bearing on the circular surface of said shaft closely adjacent said slot, said clutch gear having a plurality of clutch dogs projecting inwardly from its annular body and including driving faces directed forwardly at an angle to a radius from the axis of rotation, said dogs having roots which initially engage only the tip ends of said shuttle pin, whereby said clutch will absorb and minimize the shock of engagement of said pin and wear and strain on said shaft.

References Cited in the file of this patent

UNITED STATES PATENTS

| | | |
|---|---|---|
| 233,637 | Passmore | Oct. 26, 1880 |
| 769,982 | Case | Sept. 13, 1904 |
| 2,705,113 | Bonanno | Mar. 29, 1955 |
| 2,711,292 | Taggart et al. | June 21, 1955 |

OTHER REFERENCES

Designing Fabricated Nylon Parts (by Zimmerli), from "Machine Design," March 1943.